J. W. CORSER.
HIGH SPEED PISTON.
APPLICATION FILED NOV. 5, 1919.
1,388,552.
Patented Aug. 23, 1921.
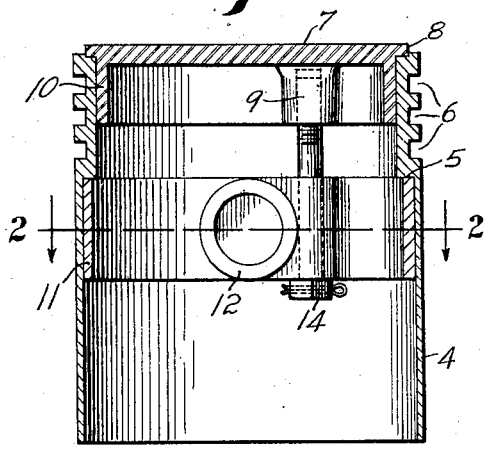
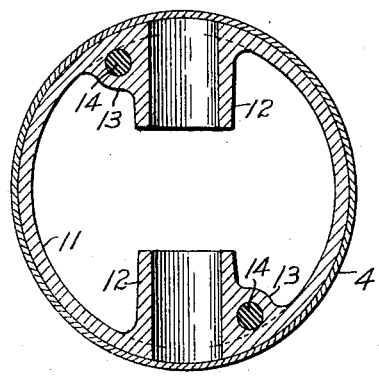
INVENTOR.
John W. Corser
BY Nestall and Wallace
ATTORNEYS.

UNITED STATES PATENT OFFICE.

JOHN W. CORSER, OF LOS ANGELES, CALIFORNIA.

HIGH-SPEED PISTON.

1,388,552. Specification of Letters Patent. Patented Aug. 23, 1921.

Application filed November 5, 1919. Serial No. 335,895.

*To all whom it may concern:*

Be it known that I, JOHN W. CORSER, a citizen of the United States, residing at Los Angeles, in the county of Los Angeles and State of California, have invented new and useful Improvements in a High-Speed Piston, of which the following is a specification.

This invention relates to a build-up piston especially adapted for use in internal combustion engines of the single acting type.

Pistons in common use in internal combustion engines of the single acting type, such as automobile engines, are built of hollow cylindrical form, and the connecting rod is secured to the piston by means of a wrist pin extending into diametrically disposed openings in the walls. Sufficient stock is provided at the openings for securely mounting the pins therein. A large proportion of the pistons are of cast iron or some compound of iron. Pistons of the type just mentioned are heavy and not adaptable for high speed. Furthermore, the strain upon the cylindrical wall caused by the pressure of the wrist pin causes warping from the true circular form. In addition to this, the piston expands unevenly due to the distribution of the metal not being uniform. This results in the cylinder wearing unevenly with a consequent leakage of gas around the sides and rattling during operation. The wrist pin often becomes displaced or broken, thereby scoring the walls of the cylinder to the extent that the usefulness of the latter is destroyed or the groove formed by the wrist pin must be inlaid. Another difficulty results from carbon collecting at the wrist pin openings in the cylinder and scoring the latter. Pistons of aluminum have been used in order to provide lightness, but as this metal is soft, the edges of the piston ring grooves feather or bur over the piston rings, when the engine becomes warm, thereby preventing expansion of the rings and resulting in leakage.

The objects of my invention are first, to provide a light piston suitable for high speed; second, to provide a piston having walls of hard metal of uniform thickness; third, to provide a piston in which the wrist pin does not extend through the cylindrical wall thereof; and fourth, to provide a piston which is easily assembled, simple in structure, easily machined, and durable.

These objects will be more fully understood, as will also other objects and corresponding accomplishments of my invention from the following detailed description of a preferred embodiment thereof. For the purpose of this description, reference is had to the accompanying drawing, in which:

Figure 1 is an axial section through a piston; Fig. 2 is a section taken on the line 2—2 of Fig. 1; and Fig. 3 is a perspective view of the parts of the piston in disassembled position.

Referring more particularly to the drawing, 4 indicates the wearing cylinder or shell of the piston, which may be made of cast iron. It is formed adjacent the upper end with a shoulder 5, and externally with piston ring grooves 6. Nesting in the top of the shell is a head 7 preferably of aluminum. The head is formed with a flange 8 for abutting the head of the shell. Projections 9 are formed at diametrically opposite points upon the skirt 10 of the head. Disposed within the skirt of the piston in a wrist pin ring 11, preferably of aluminum which abuts the shoulder 5. Formed on the interior of the ring at diametrically opposite points are bosses 12 to receive the wrist pin. The bosses are bored so the wrist pin may be slipped therein from the outside of the ring. Fillets 13 are formed on the bosses and ring of sufficient stock to be bored for receiving stud bolts 14. The projections 9 are bored and threaded so that the bolts will screw therein.

To assemble the piston, a connecting rod is placed in position between the bosses 12 and the wrist pin inserted. The ring 11 is then placed within the skirt of the piston, and the head 7 slipped into position. The stud bolts 14 are then inserted and tightened. The piston is then in assembled form for insertion in the cylinder.

It will be noted that there is no opportunity for the wrist pin to work loose and score the cylinder. The shell portion of the piston is of uniform thickness, and will expand uniformly. The wrist pin ring being of aluminum, there is no large amount of heavy metal to increase the weight of the piston. There are no soft metal wearing parts to bur or become feathered.

The shell 4 is the portion, which wears, and as it can be replaced, the piston is practically indestructible.

What I claim is:

A piston comprising a cylindrical shell of hard metal having an internal diameter reduced at the top to form an internal shoulder for a wrist pin ring, a head of light weight metal detachably mounted on said shell and having a portion telescoping within said shell so that it may be turned, a wrist pin ring of light weight metal having diametrically disposed openings extending therethrough forming seats for a wrist pin mounted within said shell so as to turn and abutting said shoulder, an adjustable means detachably securing said head to said ring.

In witness that I claim the foregoing I have hereunto subscribed my name this 29th day of October, 1919.

JOHN W. CORSER.